United States Patent
Al-Ofi et al.

(10) Patent No.: US 11,215,035 B2
(45) Date of Patent: Jan. 4, 2022

(54) METHOD TO PREDICT RESERVOIR FORMATION PERMEABILITY USING COMBINED ACOUSTIC AND MULTI-FREQUENCY DIELECTRIC MEASUREMENTS

(71) Applicant: Schlumberger Technology Corporation, Sugar Land, TX (US)

(72) Inventors: Salah Mohammed Al-Ofi, Al-Khobar (SA); Wael Abdallah, Al-Khobar (SA); Mohammed Badri, Al-Khobar (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 567 days.

(21) Appl. No.: 15/890,759

(22) Filed: Feb. 7, 2018

(65) Prior Publication Data

US 2019/0242221 A1    Aug. 8, 2019

(51) Int. Cl.
    *E21B 47/107*    (2012.01)
    *E21B 43/02*     (2006.01)
    (Continued)

(52) U.S. Cl.
    CPC .......... *E21B 43/025* (2013.01); *E21B 47/107* (2020.05); *E21B 47/14* (2013.01);
    (Continued)

(58) Field of Classification Search
    CPC ...... E21B 43/025; E21B 47/107; E21B 47/26; E21B 47/14; E21B 49/088; E21B 49/10;
    (Continued)

(56) References Cited

U.S. PATENT DOCUMENTS 3,599,085 A    8/1971  Semmelink
8,682,587 B2*  3/2014  Singer .................. G01V 11/007
                                                    702/11
(Continued)

FOREIGN PATENT DOCUMENTS

WO    2005/096023 A1    10/2005

OTHER PUBLICATIONS

Archie, G. E., "The Electrical Resistivity Log as an Aid in Determining Some Reservoir Characteristics", Transactions of the AIME, 1942, 146(1), pp. 54-62.
(Continued)

*Primary Examiner* — Krystine E Breier
(74) *Attorney, Agent, or Firm* — Trevor G. Grove

(57) ABSTRACT

Methods may include calculating a formation permeability for a subterranean formation from a combination of dielectric measurements and acoustic measurements, wherein the formation permeability is calculated according to the formula: $k_g = a(V_x \sigma_w / \varepsilon_r)^b$, where $V_x$ is either $V_p$, $V_s$, or $V_p/V_s$, $\sigma$ is formation conductivity, $\varnothing_w$ is water-filled porosity, and a and b are constants that are empirically determined for the frequency selected with respect to $V_x$; and creating a design for a wellbore operation from the calculated formation permeability. Methods may also include obtaining a dielectric measurement from a downhole formation; obtaining an acoustic measurement from a downhole formation; and calculating a formation permeability from a combination of the dielectric measurement and the acoustic measurement.

14 Claims, 6 Drawing Sheets

(51) Int. Cl.
| | |
|---|---|
| *E21B 49/08* | (2006.01) |
| *E21B 49/10* | (2006.01) |
| *E21B 47/14* | (2006.01) |
| *G01V 1/46* | (2006.01) |
| *G01V 11/00* | (2006.01) |
| *G01V 3/38* | (2006.01) |
| *G01V 1/50* | (2006.01) |
| *E21B 47/26* | (2012.01) |

(52) U.S. Cl.
CPC ............ *E21B 47/26* (2020.05); *E21B 49/088* (2013.01); *E21B 49/10* (2013.01); *G01V 1/46* (2013.01); *G01V 1/50* (2013.01); *G01V 3/38* (2013.01); *G01V 11/00* (2013.01); *G01V 2210/6244* (2013.01)

(58) Field of Classification Search
CPC ... G01V 1/46; G01V 1/50; G01V 3/38; G01V 11/00; G01V 2210/6244
See application file for complete search history.

(56) References Cited

U.S. PATENT DOCUMENTS

| | | | |
|---|---|---|---|
| 2008/0125974 | A1 | 5/2008 | Dubinsky et al. |
| 2011/0019500 | A1* | 1/2011 | Plyushchenkov ...... G01V 11/00 367/31 |
| 2013/0002258 | A1 | 1/2013 | Ligneul et al. |
| 2014/0318232 | A1* | 10/2014 | Pairoys .................. E21B 49/00 73/152.05 |
| 2016/0097876 | A1 | 4/2016 | Freed et al. |
| 2018/0203151 | A1* | 7/2018 | Kouchmeshky ......... G01V 3/26 |
| 2019/0204466 | A1* | 7/2019 | Zhang ..................... G01V 3/34 |
| 2019/0293815 | A1* | 9/2019 | Jocker .................... G01V 1/50 |
| 2020/0110191 | A1* | 4/2020 | Gkortsas ................. G01V 3/38 |

OTHER PUBLICATIONS

Biot, M. A., "Mechanics of Deformation and Acoustic Propagation in Porous Media", Journal of Applied Physics, 1962, 33(4), 1482-1498.
Bona, N. et al., "Electrical Measurements in the 100 Hz to 10 GHz Frequency Range for Efficient Rock Wettability Determination", SPE-69741-PA, SPE Journal, 2001, 6(1), pp. 80-88.
Brie, A., et al., "Effect of Spherical Pores on Sonic and Resistivity Measurements", SPWLA-198-W, SPWLA 26th Annual logging Symposium, Dallas, Texas, USA, 1985, 20 pages.
Brie, D. et al., "Quantitative Formation Permeability Evaluation from Stoneley Waves", SPE 60905-PA, SPE Reservoir Evaluation and Engineers, 2000, 3(2), pp. 109-117.
Chen, H. et al., "Pore-Scale Evaluation of Dielectric Measurements in Formations with Complex Pore and Grain Structures", Petrophysics, 2014, 55(6), pp. 587-597.
Endo, T. et al., "Fracture and Permeability Evaluation in a Fault Zone from Sonic Waveform Data", SPWLA-1997-R, Society of Petrophysicsts ad Well-Log Analysts, presented at the SPWLA 28th Logging Symposium, Houston, Texas, USA, 1997, 13 pages.
Feng S. et al., "Geometrical model of conductivity and dielectric properties of partially saturated rocks", Journal of Applied Physics, 1985, 58(8), 3236.
Hizem, M. et al., "Dielectric Dispersion: A New Wireline Petrophysical Measurement", SPE-116130, presented at the SPE Annual Technical conference and Exhibition, Denver, Colorado, USA, 2008, 21 pages.
Hossain, Z. et al., "Petrophysics and rock physics modeling of diagenetically altered sandstone", Interpretation, 2015, 3(1), pp. SA107-SA120.
Josh, "A combination dielectric and acoustic laboratory instrument for petrophysics," Measurement Science and Technology, Nov. 22, 2017, pp. 2-6, 16-17.
Morris, C. F. et al., "1984. A New Sonic Array Tool for Full Waveform Logging", SPE-13285, presented at the 59th SPE Annual Technical Conference and Exhibition, Houston, Texas, USA, 1984, 7 pages.
Pirson, S. J. et al., "Prediction of Relative Permeability Characteristics of Intergranular Reservoir Rocks from Electrical Resistivity Measurements", SPE 749-PA, Journal of Petroleum Technology, 1964, 16(5), pp. 561-570.
Pride, S. R., "Governing equations for the coupled electromagnetics and acoustics of porous media", Physical Review B, Condensed Matter, 1994, 50(21), p. 15678-15696.
Roth, K. et al., "Calibration of Time Domain Reflectometry for Water Content Measurement Using a Composite Dielectric Approach", Water Resources Research, 1990, 26(10), pp. 2267-2273.
Seleznev, N. et al., "Formation Properties Derived from Multi-Frequency Dielectric Measurement", SPWLA-2006-VVV, presented at the SPWLA 47th Annual Logging Symposium, Veracruz, Mexico, 2006, 12 pages.
Sen, P. N. et al., "A self-similar model for sedimentary rocks with application to the dielectric constant of fused glass beads", Geophysics, 1981, 46(5), pp. 781-795.
Tang, X. M. et al., "Dynamic permeability and borehole Stoneley waves: A simplified Biot-Rosenbaum model", Journal of the Acoustical Society of America, 1991, 90, pp. 1632-1646.
Wang, K. et al., "Determination of Permeability from Flexural Waves in Dipole Acoustic Logging", SEG-1999-0033, presented at the SEG Annual Meeting, Houston, Texas, USA, 1999, 4 pages.
Worthington, P. F., "Petrophysical estimation of permeability as a function of scale", Lovell, M. A. & Hervey, P. K. (eds), in Developments in Petrophysics, Geological Society Special Publication, 1997, 122, pp. 159-168.
Wu, et al., "Inversion of Permeability from Full Waveform Acoustic Logging Data," Acta Geophysica Sinica, vol. 38(1), pp. 110-124, 1995 with machine translation of the abstract in English.
Wyllie, M. R. J. et al., "Elastic Wave Velocities in Heterogeneous and Porous Media", Geophysics, 1956, 21(1), pp. 41-70.
International Search Report and Written Opinion for the counterpart International patent application PCT/US2019/016445 dated May 21, 2019.

* cited by examiner

METHOD TO PREDICT RESERVOIR FORMATION PERMEABILITY USING COMBINED ACOUSTIC AND MULTI-FREQUENCY DIELECTRIC MEASUREMENTS

BACKGROUND

Hydrocarbon exploration and recovery often involves various geophysical methods to detect the presence of hydrocarbon reservoirs or formation features capable of trapping hydrocarbons. In addition to identifying hydrocarbon reserves, geophysical methods may be employed to determine physical features such as rock permeability and porosity that govern fluid transport through the formation and provide some estimate of possible rates of recovery of hydrocarbon from the formation. For example, geophysical characterization may include electrical or electromagnetic (EM) logging methods to measure conductivity, density, porosity, and rock texture within the wellbore, providing estimates of water or hydrocarbon content and formation rock type.

However, complex pore network geometries and the presence of conductive rock types such as clays and zeolites increase the error rate and complicate the estimation of formation properties from well logs. Complex pore networks increase the uncertainty in methodologies used for conductivity and permeability by limiting the ability of some water-saturated formations such as shales to be detected, while conductive rock intervals may obscure the location of hydrocarbon reservoirs in the formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods that include calculating a formation permeability for a subterranean formation from a combination of dielectric measurements and acoustic measurements, wherein the formation permeability is calculated according to the formula: $kg=a(Vx\sigma\O_w/\varepsilon r)b$, where Vx is either Vp, Vs, or Vp/Vs, $\sigma$ is formation conductivity, $\O w$ is water-filled porosity, and a and b are constants that are empirically determined for the frequency selected with respect to Vx; and creating a design for a wellbore operation from the calculated formation permeability.

In another aspect, embodiments of the present disclosure are directed to a method that includes obtaining a dielectric measurement from a downhole formation; obtaining an acoustic measurement from a downhole formation; calculating a formation permeability from a combination of the dielectric measurement and the acoustic measurement.

In another aspect, embodiments in accordance with the present disclosure are directed to a system that includes a dielectric scanning module; an acoustic scanning module; and a processor configured to calculate a formation permeability from a combination of a dielectric measurement obtained from the dielectric scanning module and acoustic measurements obtained from the acoustic scanning module, wherein the formation permeability is calculated according to the formula: $kg=a(Vx\sigma\O_w/\varepsilon r)b$, where Vx is either Vp, Vs, or Vp/Vs, $\sigma$ is formation conductivity, $\O w$ is water-filled porosity, and a and b are constants that are empirically determined for the frequency selected with respect to Vx.

Other aspects and advantages of the claimed subject matter will be apparent from the following description and the appended claims.

DETAILED DESCRIPTION

Figure 1:
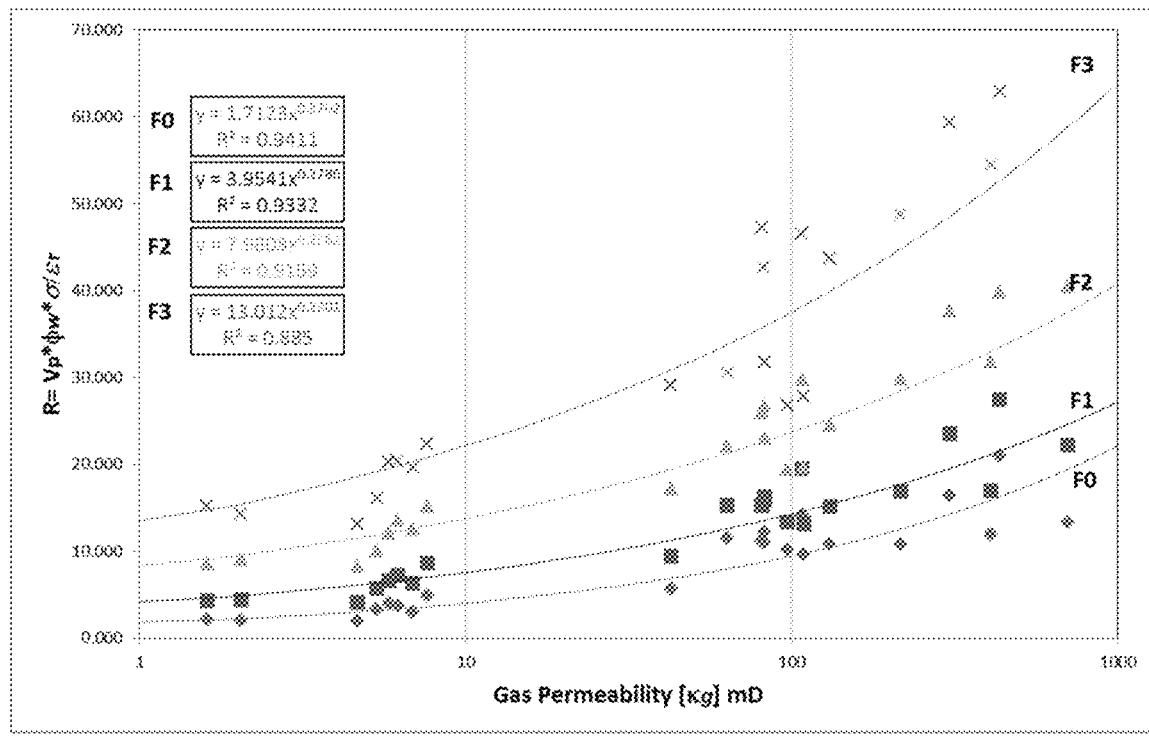
FIG. 1 is a graphical representation showing a normalized electromechanical parameter as a function of gas permeability based on compressional velocity in accordance with embodiments of the present disclosure.

In one aspect, embodiments disclosed herein relate to methods for estimating reservoir formation permeability by combining multi-frequency dielectric measurements and acoustic measurements to determine formation permeability. In one or more embodiments, methods may utilize information from both acoustic and dielectric measurements to determine formation permeability for a range of different formation lithologies and that is not dependent on restricted ranges of porosity or knowledge of fluid composition within the wellbore.

Formation permeability is a key petrophysical parameter for exploration and production in the petroleum industry. While permeability measurements of reservoir formation may be prepared from core samples in a laboratory that are obtained and transferred from a downhole environment, this approach is costly and time consuming. Alternative approaches may include using data obtained from downhole measurements, including many types of well logs, to determine formation rock permeability.

Examples of alternative approaches include the calculation of fluid mobility in a formation from Stoneley wave measurements obtained from acoustic well log data as discussed in Biot, 1962, "Mechanics of deformation and acoustic propagation in porous media." *J. App. Phys.*, 33(4), 1482-1498. In the outlined approach, complex expressions are constructed for the axial component of the wave vector of a low-frequency Stoneley wave. Stoneley attenuation (or travel time delay) is affected by formation permeability and is proportional to parameters shown in Eq. 1, where $\kappa_0$ is the rock permeability, $\eta$ is the formation fluid viscosity and $K_f$ is the formation fluid modulus or incompressibility.

$$\text{Stoneley Attenutation} \propto \frac{\kappa_0}{\eta\sqrt{K_f}} \quad (1)$$

These expressions enable the quantification of formation fluid mobility from acoustic logging, however, the methodology is only applicable to specific lithologies such as sandstones having a minimum of 10% porosity. Further, Eq. 1 uses knowledge of fluid properties (viscosity, for example) to calculate formation fluid permeability from Stoneley waves, which requires additional downhole logging tools or downhole fluid sampling followed by PVT analysis in the laboratory.

In another approach, electrical measurements are used to measure various aspects of formation porosity and rock texture. A common correlation that governs the relation between formation resistivity to its porosity is described by Archie's law. As shown in Eq. 2, Archie's law is an empirical relation relating the formation factor F and cementation factor m to the porosity Ø, and factor a that corrects for conducting minerals such as brine in a sample of saturated reservoir rock.

$$F = \frac{a}{m} \quad (2)$$

Modifications to Archie's law have been proposed by Worthington, 1997, "Petrophysical estimation of permeability of scale," in Developments in Petrophysics, Geological Society Special Publication, No. 122, 159-168. The modification refines the relationship between formation factor and permeability in Eq. 2 and provide an expression shown in Eq. 3 in which formation factor F decreases as permeability k increases, and b and c are positive empirical constants.

$$k = \left(\frac{b}{F}\right)^{1/c} \quad (3)$$

Electrical and mechanical effects in porous media filled with conductive fluid are interdependent, as mechanical disturbances may produce electromagnetic fields that impact the observed electronic properties of the sample. The propagation of interdependent acoustic and electromagnetic waves in porous media is discussed in Pride, 1994, "Governing equations for coupled electromagnetics and acoustics of porous media," *Phys. Rev. B., Condensed Matter*, 50, 15678-15696. The equations presented describe the electrokinetic behavior of porous media by coupling Maxwell's equations for electromagnetic waves and Biot's equations describing pore fluid motions. These relationships are then used to estimate permeability of borehole formation from downhole logging.

Acoustic techniques to measure rock permeability are also discussed in U.S. Pat. No. 3,599,085, which describes a method in which a sonic source emits low frequency sound waves in a wellbore within the range from 20 to 500 Hz. Sound waves create an oscillating electric field in the surrounding fluid-saturated rock, which is measured in at least two locations close to the source by contact pad touching the borehole wall. The ratio of the measured potentials to the electrokinetic skin depth is then used to estimate formation permeability. The ratios of the electrokinetic potential magnitudes at the spaced electrodes and the transducer electrode are then related to the electrokinetic skin depth δ of the formation and actual permeability k of the formation from the relationship defined in Eq. 4, where δ is the electrokinetic skin depth, ω is the product of 2π and the acoustic frequency, Ø is the formation porosity, and μ, ρ, and c are the viscosity, density, and sound velocity of the formation fluid, respectively.

$$\delta = c\sqrt{\frac{2k\rho}{\omega\mu}} \quad (4)$$

Another example of an acoustic method of determining permeability is presented in U.S. Pat. Pub. 2011/0019500A1. In the method, acoustic energy pulses are transmitted into the formation and the acoustic and electromagnetic response signals are measured. The acoustic and electromagnetic signals are separated, and a Stoneley wave is derived. The separated acoustic and electromagnetic response signal components and the synthesized Stoneley wave are then compared and the permeability is determined from differences. A simple expression of electrokinetic signal HP(f) is shown in Eq. 5, where $M_b$ [1,2], $\alpha\infty$ the formation tortuosity, f is the acoustic wave frequency, $\kappa_0$ is the formation permeability, $p_f$ is the density of the pore fluid, and $Ø_\eta$ is the water-filled porosity.

$$HP(f) = 2\pi \frac{\alpha_\infty \rho_f \kappa_0}{M_b \; \eta} f \quad (5)$$

However, the method assumes that the formation is homogenous and saturated with a non-viscous fluid, which can lead to errors when measuring non-standard formations such as carbonates and formations containing varied rock types.

The correlation between electrical and elastic properties of rock formation has been suggested as a linear relationship between electrical properties, formation factor F, and permeability, if the rock type and diagenesis are known. For example, the relationship is discussed in detail by Hossain et al., 2015, "Petrophysics and rock physics modeling of diagenetically altered sandstone," *Interpretation*, 3(1), SA107-SA120. Particularly, elastic properties such as P-wave velocity may be assumed as approximately linear with the formation factor if microstructure of the formation is known. The study lacks the permeability dependence on both electrical and elastic properties simultaneously, and seeks an empirical relationship between formation factor and permeability, as well as $V_p$ correlation with permeability. The study also focuses on clean sandstones, and correlations may have varying degrees of error depending on the stiffness of the formation.

However, the previous approaches are applied primarily on sandstone with uniform packing, where porosity is the primary factor that governs formation permeability. In practice, using resistivity data and formation factor separately for formations other than sandstone can introduce significant error, particularly where grain-size distribution is not uniform and cementation has altered rock tortuosity. Stoneley waves and electrokinetic measurements also depend on borehole conditions and porosity range limitations. Many of these approaches to determine formation permeability also require knowledge of formation fluid properties, which requires the additional time and cost of obtaining fluid samples. Further, for high permeability zones where open fractures are present, Stoneley waves can be compromised by mud build up.

Methods in accordance with the present disclosure overcome these limitations by integrating acoustic measurements with multi-frequency dielectric measurements to estimate gas permeability ($k_g$) from wellbore logs. Particularly, methods may derive variables from dielectric dispersion measurement and acoustic measurements that are not dependent on porosity range and type. In one or more embodiments, methods may be used to determine formation permeability for a range of different formation lithologies with no restriction on porosity and rock texture.

In one or more embodiments, methods may combine multi-frequency dielectric data with acoustic data to predict formation permeability for a given formation using frequency dependent correlations. Formation permeability may then be used in the design and execution of wellbore operations, including well placement, drilling, and production operations. In some embodiments, workflows and derived correlations may be applied to any reservoir formation without restrictions on porosity or rock texture, because the multi-frequency dielectric data and acoustic data utilized are independent of rock type and downhole fluid properties.

Multi-frequency Dielectric Measurements

Multi-frequency dielectric measurements obtained from a water-saturated rock sample may depend on a number of factors including porosity, texture, and connectivity of water-filled pores in a rock sample. Dielectric measurements may be classified into high and low frequency components. High frequency components of a dielectric measurement include frequencies (>300 MHz, for example) that are dependent on the water-filled porosity of the rock sample, which may be used to determine the water-filled porosity for the sample using a number of known physical correlations. Low frequency components of a dielectric measurement provide geometric information about the porous structure of the rock sample that is governed, at least in part, by Maxwell-Wagner polarization.

Methods in accordance with the present disclosure may use one or more electromagnetic tools to obtain frequency-dependent attenuation and phase delay from electric and/or magnetic fields, which may then be inverted to frequency-dependent complex dielectric constants defined as shown in Eq. 6, where $\varepsilon^*$ is the complex measured permittivity for the formation, $\varepsilon_r$ is the relative dielectric permittivity (dielectric constant) and is the real part of the complex permittivity, $\omega$ is the angular frequency, and the imaginary component is defined by the free space permittivity $\varepsilon_0$, and the conductivity of the sample $\sigma$.

$$\varepsilon = \varepsilon_r(\omega) + i\frac{\sigma(\omega)}{\omega\varepsilon_0} \quad (6)$$

The water-filled porosity for the sample may be found using different models such as the Complex Refractive Index Model (CRIM) shown in Eq. 7, where εm is the rock matrix permittivity, εw is the filling brine permittivity, and Øw is the water-filled porosity in fractional unit.

$$\sqrt{\varepsilon^*} = \sqrt{\varepsilon_m}(1-\emptyset_w) + \sqrt{\varepsilon_w}\emptyset_w \quad (7)$$

The water-filled porosity $\emptyset_w$ may be computed from the high frequency component of a dielectric measurement, where Maxwell-Wagner polarization due to conductor-insulator interfaces is assumed to be negligible. The computed water-filled porosity $\emptyset_w$ is then used to correlate electrical and mechanical properties to determine a permeability for the formation. In some embodiments, a multi-frequency dielectric constant might be used to calculate water filled porosity, such as that discussed in Feng et al., 1985, "Geometrical model of conductivity and dielectric properties of partially saturated rocks," J. Appl. Phys., 58(8), 3236.

Water-filled porosity $\emptyset_w$ may be computed in some embodiments using CRIM for some formations using high frequency dielectric measurement (960 MHz, for example). For example, the ratio of dielectric constant to conductivity of the formation ($\varepsilon_r/\sigma$) is dependent only on porosity at high frequency measurements, which permits $\emptyset_w$ to be calculated from the high frequency dielectric values alone in some embodiments.

In some embodiments, specific types of formations such as carbonates may use geometrical models that use multi-frequency data to determine water-filled porosity $\emptyset_w$. For example, in carbonate formations, the ratio $\varepsilon_r/\sigma$ at low frequencies (for example, 24 MHz, 102 MHz, and sometimes 360 MHz) depends on factors such as porosity, texture, pore/grain shapes, and permeability.

Acoustic Measurement

Acoustic measurements may also provide information regarding a number of formation properties including rock type, permeability, and fluid contents. During downhole measurement, an acoustic transmitter propagates an acoustic signal in a borehole, while an acoustic waveform is recorded by an acoustic receiver. The acoustic signal includes information regarding the velocity of signal travel from the transmitter to the receiver. Velocity information may be divided into a number of components including compressional velocity ($V_p$) and shear wave velocity ($V_s$) that are dependent on formation properties, including porosity and permeability. Other acoustic measurement components include Stoneley waves that propagate along solid-fluid interfaces and provide information regarding pore fluid mobility.

Acoustic tools in accordance with the present disclosure may provide frequency dependent velocity measurements for different types of waves including P-waves, S-waves, and Stoneley waves. In some embodiments, methods may utilize P-waves obtained from downhole acoustic logging measurements because of the relatively fast arrival time of the wave to the receiver, particularly in slow or soft formations where S-waves are not registered.

Normalized Electromechanical Parameter and Power Correlation

From the dielectric and acoustic measurements, permeability can be determined for any type of formation by normalizing acoustic velocity by the ratio of the relative permittivity to conductivity to calculate the normalized electromechanical parameter R, which is defined in Eq. 8.

$$R = V_p \sigma/\varepsilon_r \quad (8)$$

In some embodiments, multiplying the normalized electromechanical parameter by the water-filled porosity $\emptyset_w$ obtained from dielectric measurements may improve the correlation to permeability for a rock sample. Correlations are established between gas permeability for a number of rock samples and a normalized electromechanical parameter (R). The correlation follows a power trend and the correlation depends on frequency of dielectric measurement and permeability level of the sample. The power correlation to determine gas permeability $k_g$ follows the form shown in Eq.

9, where $V_x$ is either $V_p$, $V_s$, or $V_p/V_s$, a and b are frequency dependent and can be calibrated using laboratory data from one or more samples.

$$k_g = a(V_x \sigma \varnothing_w / \varepsilon_r)^b \qquad (9)$$

Figure 2:
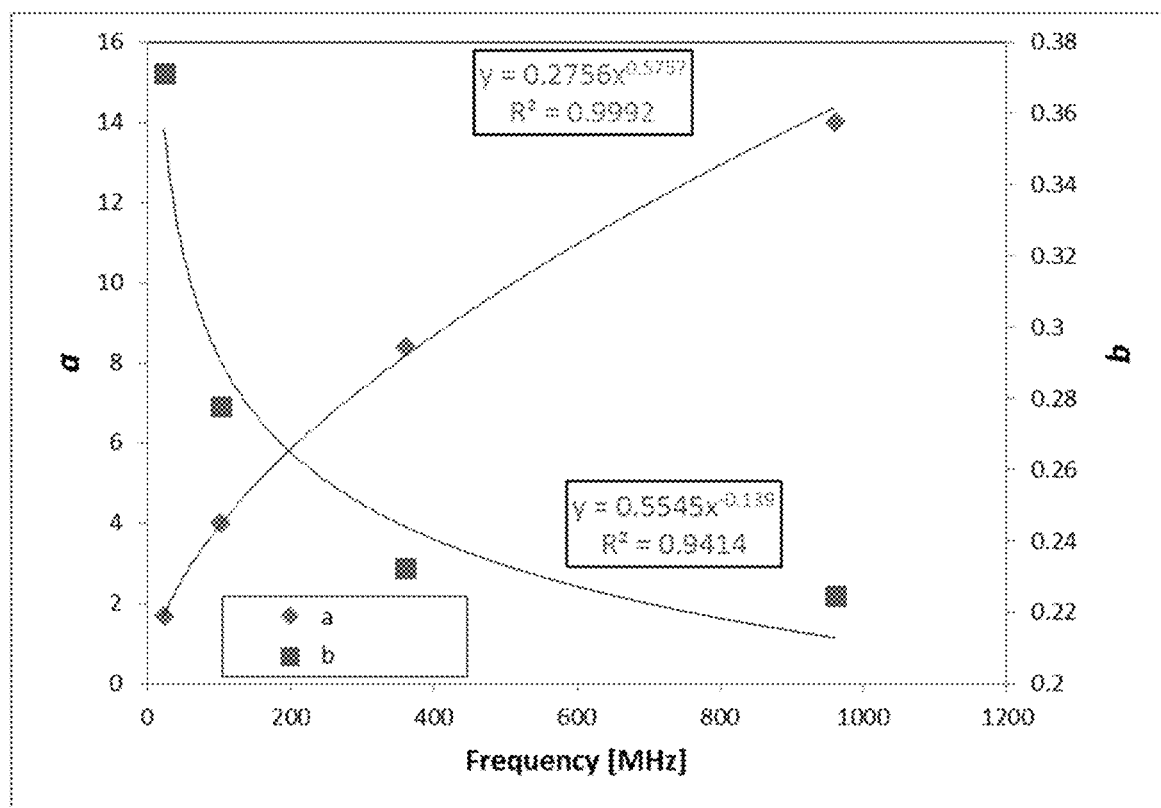
FIG. 2 is a graphical representation showing the correlation of gas permeability coefficients a and b as a function of frequency in accordance with embodiments of the present disclosure.

With respect to FIG. 1, a correlation is shown between gas permeability for several rock samples and R based on compressional velocity $V_p$ with F0=24 MHz, F1=102 MHz, F2=360 MHz, and F3=960 MHz, for fully saturated samples in laboratory measurements. The parameters a and b can be determined by using the empirical correlation developed from FIG. 1 at specific frequency. With particular respect to FIG. 2, the predicted correlations coefficients at different frequencies are shown. A good estimate for a and b may be obtained for a number of additional frequencies for a dielectric measurement as shown in several laboratory measurements. Parameters a and b are frequency dependent and may be used for any formation type or rock permeability.

Figure 3:
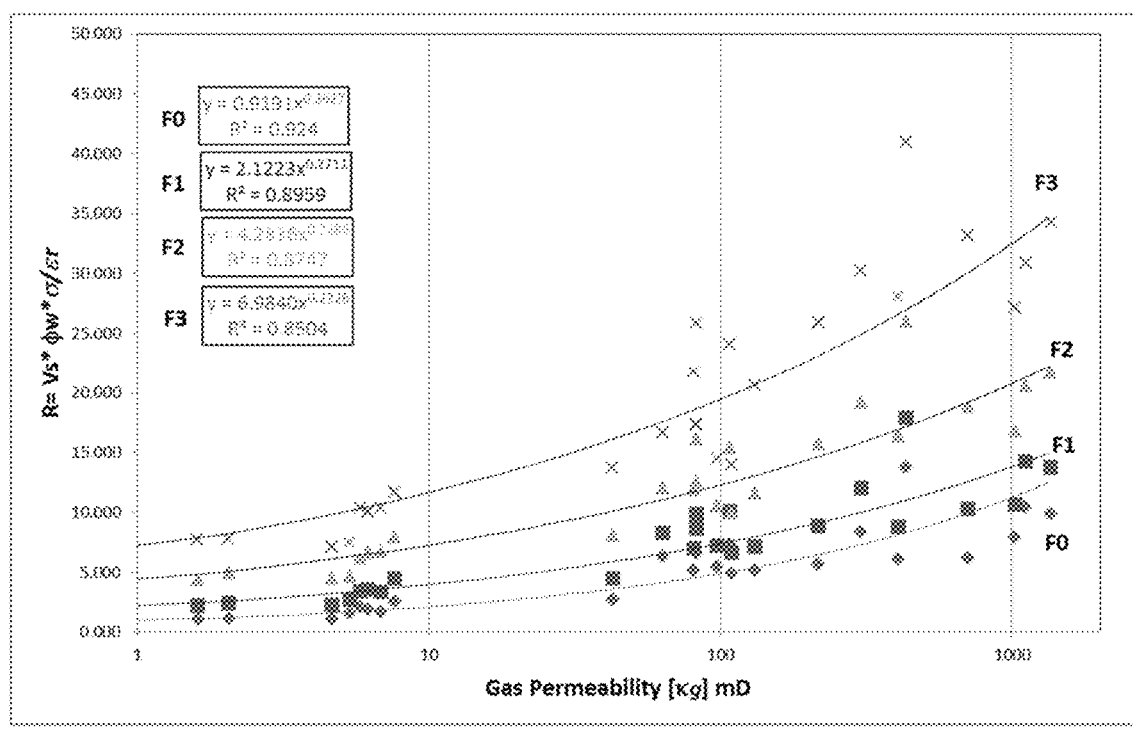
FIG. 3 is a graphical representation showing a normalized electromechanical parameter as a function of gas permeability based on shear wave velocity in accordance with embodiments of the present disclosure.
Figure 4:
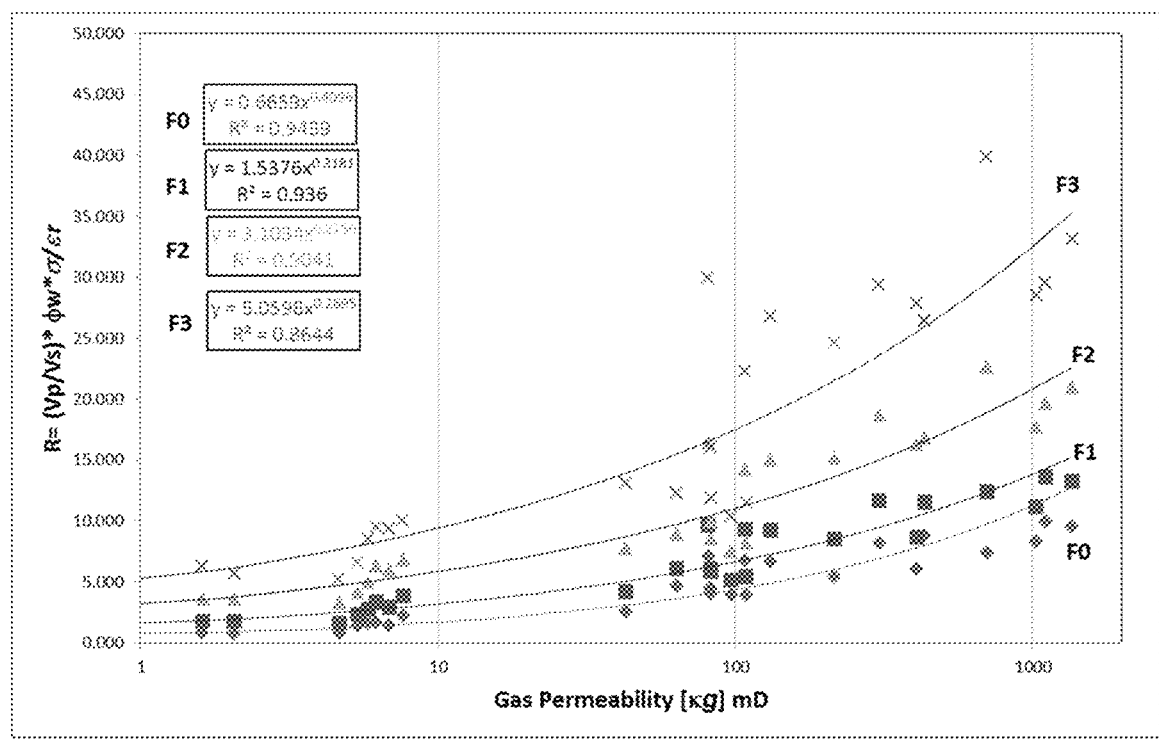
FIG. 4 is a graphical representation showing a normalized electromechanical parameter as a function of gas permeability based on a ratio of compressional and shear wave velocity in accordance with embodiments of the present disclosure.

FIG. 3 and FIG. 4 show a similar correlation for $V_s$ and $V_p/V_s$ data respectively. With particular respect to FIG. 3, a correlation is shown between Gas permeability and normalized electromechanical parameter based on shear wave velocity $V_s$, with F0=24 MHz, F1=102 MHz, F2=360 MHz, and F3=960 MHz. As shown $V_s$ also follows the same correlation as $V_p$. With particular respect to FIG. 4, a correlation is shown between Gas permeability and normalized electromechanical parameter based on $V_p/V_s$ with F0=24 MHz, F1=102 MHz, F2=360 MHz, and F3=960 MHz.

Application

Figure 5:
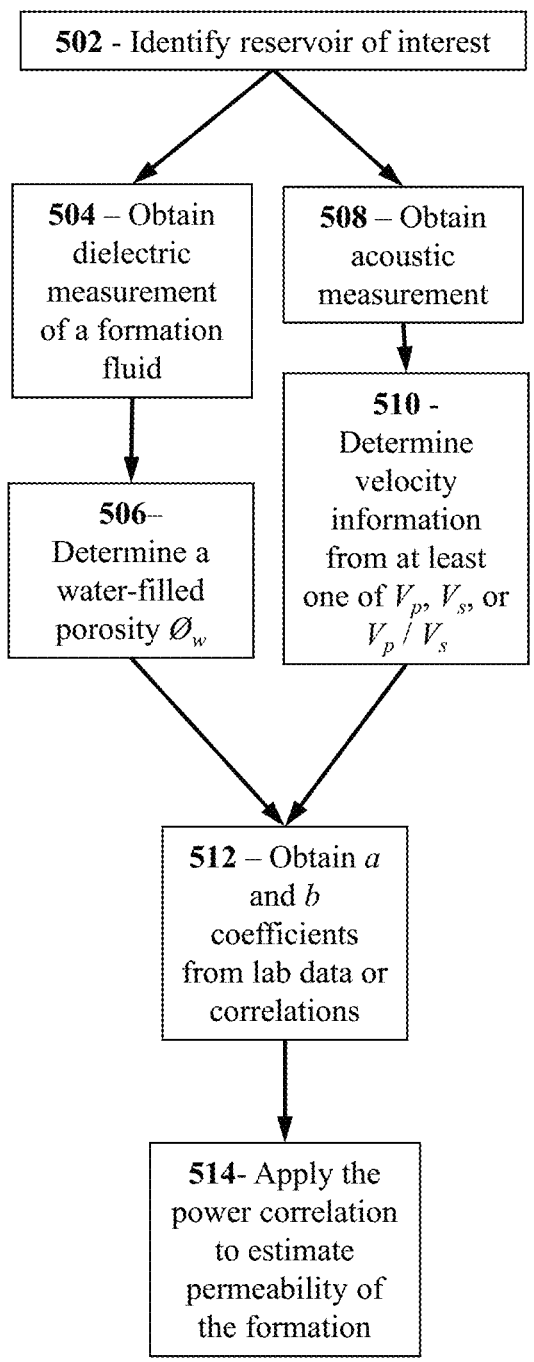
FIG. 5 is a flow diagram depicting a method in accordance with embodiments of the present disclosure.

With particular respect to FIG. 5, an embodiment of a workflow to calculate formation permeability in accordance with the present disclosure is shown. A reservoir or formation of interest is identified at 502, and the dielectric properties of the formation sample are obtained using a dielectric scanning tool at 504. The dielectric properties are then used to determine a water-filled porosity $\varnothing_w$ at 506. Next, acoustic measurements or acoustic logs are obtained at 508 using an acoustic tool. The acoustic measurement is used to obtain velocity information from the formation at 510, such as compressional and shear wave velocities, or ratios of the velocities. The coefficients a and b are determined empirically at 512 from relevant lab data or correlations. The power correlation is then applied to estimate the permeability of the formation $k_g$ at 514.

Methods to determine permeability in accordance with the present disclosure may be applied to both water saturated and partially saturated rock formations. Estimates of permeability may be improved in some embodiments by selecting formations and samples in which rock type or lithology are known or limited in number. For example, certain pore types or grain texture tend to have a distinguished acoustic or dielectric dispersion signal from other types and matching data signatures to known rock compositions in a sample will improve the electromechanical correlations used in the present method.

Wellbore Tools

In one or more embodiments, electromagnetic and acoustic measurements may be obtained using a logging tool equipped with an electromagnetic module and an acoustic module that perform the measurements in sequence or simultaneously at one or more locations in the formation. In some embodiments, an electromagnetic module and an acoustic module may be incorporated in a wellbore tool that is lowered by wireline to simultaneously determine acoustic properties such as P-wave or S-wave velocity, and electromagnetic properties such as multi-frequency dielectric constants. In some embodiments, multiple wellbore tools may be used and placed into the wellbore at the same time or in sequence.

In one or more embodiments, wellbore tools in accordance with the present disclosure may be equipped with a dielectric scanning tool. Dielectric scanning tools in accordance with the present disclosure include multi-frequency dielectric scanners that determine dielectric constants at multiple frequencies. For example, dielectric scanning tools may include array dielectric scanner tools from SCHLUMBERGER™ that measure a dielectric constant at four frequencies between 20 MHz to 1 GHz; F0=24 MHz, F1=102 MHz, F2=360 MHz and F3=960 MHz.

In one or more embodiments, wellbore tools in accordance with the present disclosure may be equipped with an acoustic logging device (ALD). In some embodiments, ALDs may include the eight-receiver STD-A sonic tool, commercially available from SCHLUMBERGER™.

Computing System

Figure 6:
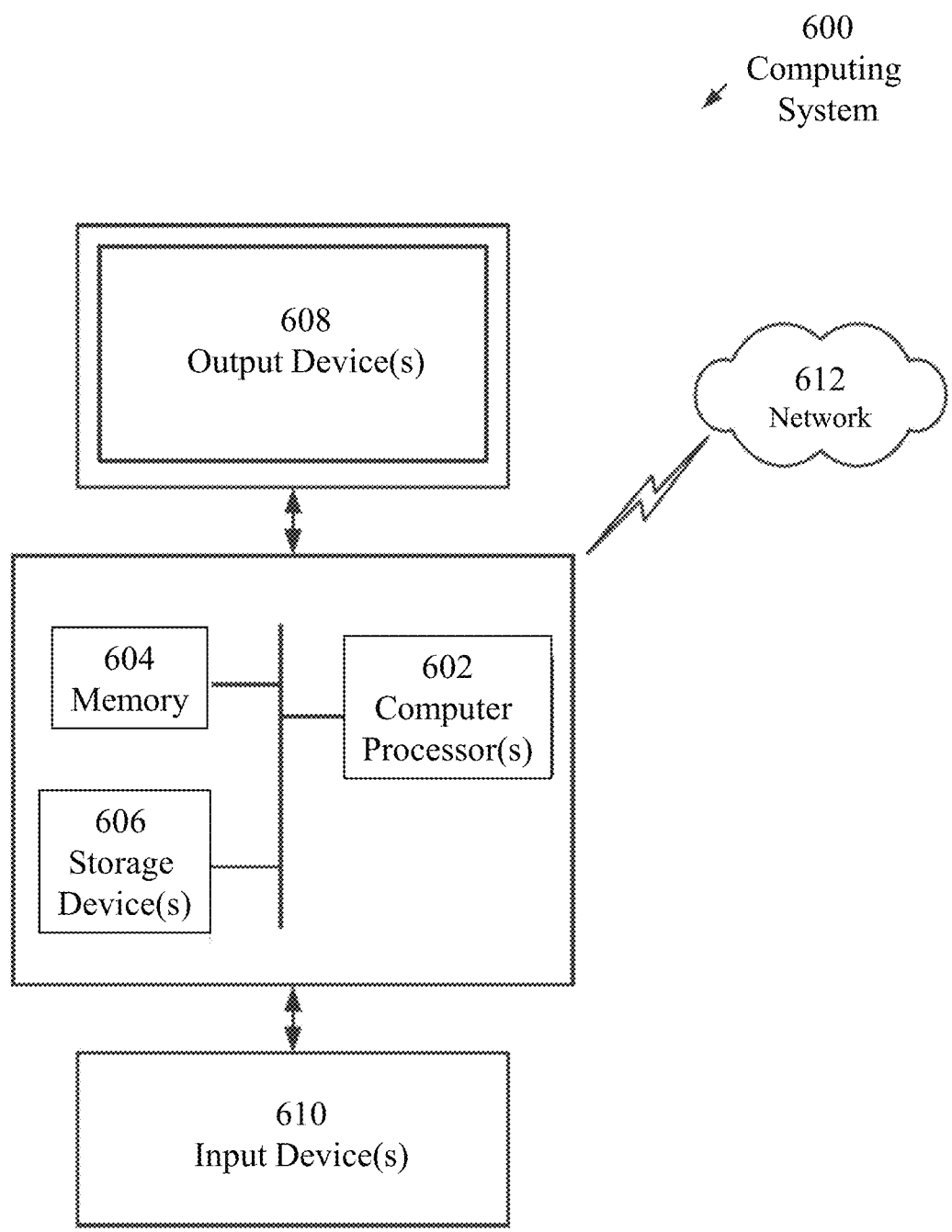
FIG. 6 is a schematic showing an example of a computer system for executing methods in accordance with the present disclosure.

Embodiments of the present disclosure may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). In particular embodiments, computer processor 602 may be configured to calculate formation permeability from a combination of a dielectric measurement obtained from the dielectric scanning module and acoustic measurements obtained from the acoustic scanning module, wherein the formation permeability is calculated according to Eq. 9. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the disclosure. Further, one or more elements of the aforementioned computing system (600) may be located at a remote location and connected to the other elements over a network (612).

Further, embodiments of the disclosure may be implemented on a distributed system having a plurality of nodes, where each portion of the disclosure may be located on a different node within the distributed system. In one embodiment of the disclosure, the node corresponds to a distinct computing device. Alternatively, the node may correspond to a computer processor with associated physical memory. The node may alternatively correspond to a computer processor or micro-core of a computer processor with shared memory and/or resources.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A method, comprising:
    calculating a formation permeability for a subterranean formation from a combination of dielectric measurements and acoustic measurements, wherein the acoustic measurements comprise compressional velocity ("$V_p$"), shear velocity ($V_s$), or combinations thereof, wherein the dielectric measurements comprises relative dielectric permittivity ("$\varepsilon_r$"), complex measured permittivity ($\varepsilon^*$), or combinations thereof, and wherein the water-filled porosity is determined from the dielectric measurements, and wherein the formation permeability is calculated according to the formula:

$$k_g = a(V_x \sigma \varnothing_w / \varepsilon_r)^b$$

where $V_x$ is either $V_p$, $V_s$, or $V_p/V_s$, $\sigma$ is formation conductivity, $\varnothing_w$ is water-filled porosity, and a and b are constants that are empirically determined for the frequency selected with respect to $V_x$; and
    creating a design for a wellbore operation from the calculated formation permeability.

2. The method of claim 1, further comprising executing the design for the wellbore operation.

3. The method of claim 1, wherein the acoustic measurements are obtained from an acoustic log of the subterranean formation.

4. The method of claim 1, wherein the dielectric measurements are obtained from a dielectric scanner log of the subterranean formation.

5. The method of claim 1, wherein the dielectric measurements comprise multi-frequency dielectric measurements.

6. The method of claim 1, wherein the dielectric measurements are obtained at one or more frequencies selected from a group consisting of 24 MHz, 102 MHz, 360 MHz, and 960 MHz.

7. The method of claim 1, wherein the acoustic measurements comprise P-waves obtained from downhole acoustic logging measurements.

8. The method of claim 1, wherein the water-filled porosity is determined according to the formula:

$$\sqrt{\varepsilon^*} = \sqrt{\varepsilon_m}(1-\varnothing_w) + \sqrt{\varepsilon_w}\varnothing_w$$

where $\varepsilon_m$ is the rock matrix permittivity, $\varepsilon_w$ is the water permittivity, and $\varnothing_w$ is the water-filled porosity.

9. A system, comprising:
    a dielectric scanning module;
    an acoustic scanning module; and
    a processor configured to calculate a formation permeability from a combination of a dielectric measurement obtained from the dielectric scanning module and acoustic measurements obtained from the acoustic scanning module, wherein the acoustic measurements comprise compressional velocity ("$V_p$"), shear velocity ($V_s$), or combinations thereof, wherein the dielectric measurements comprises relative dielectric permittivity ("$\varepsilon_r$"), complex measured permittivity ($\varepsilon^*$), or combinations thereof, and wherein the water-filled porosity is determined from the dielectric measurements, and, wherein the formation permeability is calculated according to the formula:

$$k_g = a(V_x \sigma \varnothing_w / \varepsilon_r)^b$$

where $V_x$ is either $V_p$, $V_s$, or $V_p/V_s$, $\sigma$ is formation conductivity, $\varnothing_w$ is water-filled porosity, and a and b are constants that are empirically determined for the frequency selected with respect to $V_x$.

10. The system of claim 9, wherein the dielectric scanning module and the acoustic scanning module are configured on a downhole tool.

11. The system of claim 9, wherein the dielectric scanning module and the acoustic scanning module are configured on separate downhole tools.

12. The system of claim 9, wherein the dielectric measurements comprise multi-frequency dielectric measurements.

13. The system of claim 9, wherein the dielectric measurements are obtained at one or more frequencies selected from a group consisting of 24 MHz, 102 MHz, 360 MHz, and 960 MHz.

14. The system of claim 9, wherein the water-filled porosity is determined according to the formula:

$$\sqrt{\varepsilon^*} = \sqrt{\varepsilon_m}(1-\varnothing_w) + \sqrt{\varepsilon_w}\varnothing_w$$

where $\varepsilon_m$ is the rock matrix permittivity, $\varepsilon_w$ is the water permittivity, and $\varnothing_w$ is the water-filled porosity.

* * * * *